Oct. 19, 1948.  S. A. MASSIMIANO  2,451,849
DENTAL ACCESSORY
Filed Sept. 4, 1946
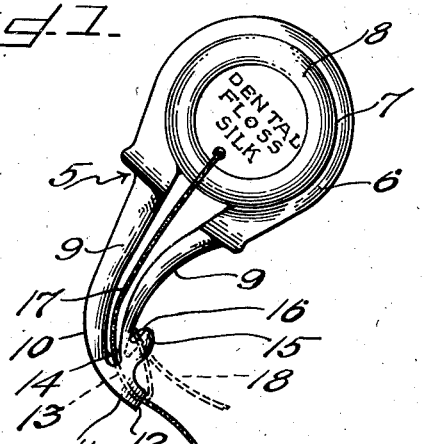
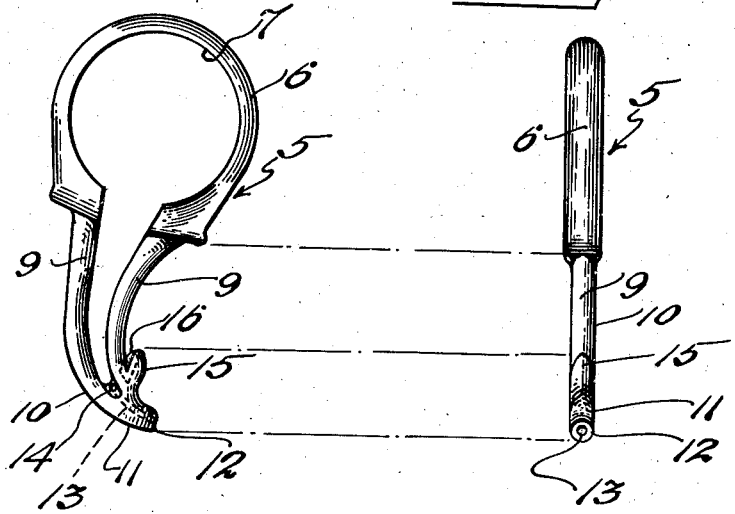
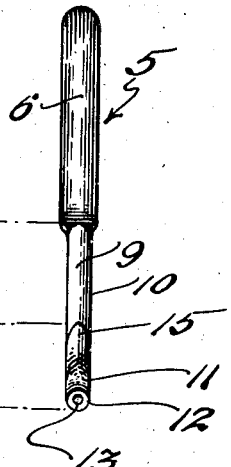
Inventor
SANTO A. MASSIMIANO
By *Clarence A. O'Brien and Harvey B. Jacobson*
Attorneys Patented Oct. 19, 1948

2,451,849

UNITED STATES PATENT OFFICE 2,451,849

DENTAL ACCESSORY

Santo A. Massimiano, Merchantville, N. J.

Application September 4, 1946, Serial No. 694,716

1 Claim. (Cl. 132—92)

This invention relates to new and useful improvements and structural refinements in dental accessories, and the principal object of the invention is to provide a device of the character herein described, such as may be conveniently and effectively employed in association with spools of dental floss for removing particles of food which are frequently lodged in the crevices between the teeth.

A further object of the invention is to provide a dental accessory which may be easily manipulated and whereby convenient access may be had to back teeth, without the conventionally experienced necessity of inserting fingers into the mouth.

Another object of the invention is to provide a dental accessory in which the spool of dental floss may be readily applied.

An additional object of the invention is to provide a dental accessory which is simple in construction, pleasing in appearance, and which will not readily become damaged.

A still further object of the invention is to provide a dental accessory which will lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a plan view of the invention, showing the spool of dental floss in situ therein Figure 2 is a plan view of the invention per se, and Figure 3 is an edge view of the same.

Like characters of reference are used to designate like parts in the specification and throughout the several views.

Referring now to the accompanying drawings in detail, the invention consists of a dental accessory designated generally by the reference character 5, the same embodying in its construction a holder 6 constructed of any suitable material and provided with a substantially circular opening 7.

This opening is adapted to receive a conventional spool of dental floss 8 which is removably retained in position therein by the inherent resiliency of the holder. This resiliency is resultant from the provision of a pair of convergent members 9 which provide what may be referred to as an extension arm 10 on the holder, but in effect, the members 9 are merely integral continuations of the body of material from which the holder is formed.

The free end portion 11 of the arm 10 at the convergent of the members 9 is arcuated and terminates in a more or less pointed extremity 12.

The arcuate portion 11 is formed with a longitudinally extending arcuate passage 13 which terminates at the inner end thereof in an opensided recess 14. This recess constitutes a guide designated by the same reference character, the purpose of which will be hereinafter more fully explained.

One of the members 9 is provided adjacent the extremity 12 with a backwardly projecting lug 15 and a suitable cutting blade 16 is mounted in this lug, as will be clearly apparent from the accompanying drawings.

When the invention is placed in use, the spool 8 is positioned in the opening 7 as already explained, and the dental floss 17 is threaded through the passage 13, as is best shown in Figure 1. It will be noted that the recess or guide 14 will effective assist in the insertion of the dental floss into the passage, whereupon the invention may be used in the well-known manner for removing particles of food from the crevices between the teeth.

The arm 10, being of substantial length and being arcuated as at 11, will facilitate convenient access to the back teeth without the conventionally experienced necessity of inserting fingers into the mouth.

When the invention is not required, the used portion of the dental floss 17 may be conveniently cut off by simply engaging the same with the blade 16, as indicated at 18 in Figure 1.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A dental accessory comprising a resilient holder provided with a substantially circular opening to receive a spool of dental floss, said holder including a pair of convergent members providing an extension arm, the free end portion of said arm at the convergence of said members being arcuated and terminating in a pointed extremity, said arcuate portion being formed with a longitudinally extending arcuate passage, an open sided recess provided at the inner end of said passage and constituting a guide, and a cutter blade mounted adjacent the free end of said arm.

SANTO A. MASSIMIANO.

REFERENCES CITED

The following references are of record in the file of this patent:

UNITED STATES PATENTS

| Number | Name | Date |
|---|---|---|
| 1,268,944 | Ecaubert | June 11, 1918 |
| 1,608,212 | Hochatadter | Nov. 23, 1926 |
| 1,627,525 | Munro | May 3, 1927 |